United States Patent [19]
Enjeti et al.

[11] Patent Number: 6,122,184
[45] Date of Patent: Sep. 19, 2000

[54] METHOD AND SYSTEM FOR AN IMPROVED CONVERTER OUTPUT FILTER FOR AN INDUCTION DRIVE SYSTEM

[75] Inventors: Prasad Enjeti; Dudi Rendusara, both of College Station, Tex.; Annette von Jouanne, Corvallis, Oreg.

[73] Assignee: The Texas A&M University System, College Station, Tex.

[21] Appl. No.: 09/100,151

[22] Filed: Jun. 18, 1998

Related U.S. Application Data

[60] Provisional application No. 60/050,187, Jun. 19, 1997.

[51] Int. Cl.[7] ..................................................... H02M 1/12
[52] U.S. Cl. ............................................................. 363/47
[58] Field of Search ................................. 363/34, 37, 39, 363/40, 47, 44

[56] References Cited

U.S. PATENT DOCUMENTS

| | | | |
|---|---|---|---|
| 4,967,334 | 10/1990 | Cook et al. | 363/34 |
| 5,111,373 | 5/1992 | Higaki | 363/37 |
| 5,315,497 | 5/1994 | Severinsky | 363/34 |
| 5,654,591 | 8/1997 | Mabboux et al. | 307/66 |
| 5,661,390 | 8/1997 | Lipo et al. | 318/803 |

OTHER PUBLICATIONS

A. Bonnett, "Analysis of the Impact of Pulse Width Modulated Inverter Voltage Waveforms on AC Induction Motors," *Conf. Record of Annual Pulp and Paper Industry Technical Conference*, pp. 68–75, 1994.

D. F. Busse, J. M. Erdman, R. J. Kerkman, D. W. Schlegel, G. L. Skibinski, "The Effects of PWM Voltage Source Inverters on the Mechanical Performance of Rolling Bearings," *IEEE Trans. Industry Applications*, vol. 33, No. 2, pp. 567–576, Mar./Apr. 1997.

Y. Murai, T. Kubota, and Y. Kawase: "Leakage Current Reduction for a High–Frequency Carrier Invert Feeding an Induction Motor," *IEEE Trans. Industry Applications*, vol. 28, No. 4, pp. 858–863, Jul./Aug., 1992.

S. Ogasawara, H. Akagi, "Modeling and Damping of High–Frequency Leakage Currents in PWM Inverter–Fed AC Motor Drive Systems," *IAS Conf. Record*, pp. 29–36, 1995.

D. F. Busse, J. M. Erdman, R. J. Kerkman, D. W. Schlegel, G. L. Skibinski, "System Electrical Parameters and Their Effects on Bearing Currents," *IEEE Trans. Industry Applications*, vol. 33, No. 2, pp. 577–584, Mar./Apr., 1997.

A. L. Julian, T. A. Lipo, "Elimination of Common Mode Voltage in Three Phase Sinusoidal Power Converters," *PESC Conf. Record*, pp. 1968–1972, 1996.

S. Kim, P. Enjeti, P. Packebush and I. Pitel, "A New Approach to Improve Power Factor and Reduce Harmonics in Three Phase Diode Rectifie Type Utility Interface," *IEEE Trans. On Industry Applications*, vol. 30, No. 6, pp. 1557–1564, Nov./Dec., 1994.

"IGBT Long Lead Filters," MTE Corporation, Menomonee Falls, WI.

A. von Jouanne, P. Enjeti, et al., "Application Issues for PWM Adjustable Speed AC Motor Drives," *IEEE Industry Application Magazines*, pp. 10–18, Sep./Oct., 1996.

A. von Jouanne, P. Enjeti, "Design Considerations for an Inverter Output Filter to Mitigate the Effects of Long Leads in ASD Applications," *I Conf. Record*, pp. 595–599, 1996.

A. Consoli, G. Oriti, A. Testa, A. L. Julian, "Induction Motor Modeling for Common Mode and Differential Mode Emission Evaluation," *IAS Conf. Record*, pp. 595–599, 1996.

*Primary Examiner*—Adolf Deneke Berhane
*Attorney, Agent, or Firm*—Baker & Botts, L.L.P.

[57] ABSTRACT

A converter output filter for an induction drive system is provided. The converter output filter (40) comprises an L-R-C network (41) that can be coupled between each converter output (38a, 38b, and 38c) of a converter (16b) and a DC-link midpoint node (35) of the converter (16b). Each L-R-C network (41) comprises an inductive element (42a, 42b, and 42c), a resistive element (44a, 44b, and 44c), and a capacitive element (46a, 46b, and 46c) coupled in series. An electrical device (18) can be coupled to the L-R-C network (41) between the respective inductive element (42a, 42b, and 42c) and the respective resistive element (44a, 44b, and 44c).

18 Claims, 2 Drawing Sheets

METHOD AND SYSTEM FOR AN IMPROVED CONVERTER OUTPUT FILTER FOR AN INDUCTION DRIVE SYSTEM

CROSS-REFERENCE TO RELATED APPLICATIONS

This application claims priority under 35 USC § 119(e) of provisional application No. 60/050,187, filed Jun. 19, 1997.

TECHNICAL FIELD OF THE INVENTION

The present invention relates generally to electric drive systems, and more particularly to a converter output filter for an induction drive system.

BACKGROUND OF THE INVENTION

Electric drive systems are utilized in nearly all industries for various applications. Electric drive systems convert electrical energy into other useful forms of energy, such as mechanical work as in the case of an electric motor, or thermal energy as in the case of an electric heater. To illustrate the operation of a typical electric drive system, the operation of an electric drive system incorporating an electric motor is described.

The electric drive system controls the operational parameters of the electric motor, such as the speed and torque of the electric motor. The electric drive system generally comprises a converter and a controller in addition to the electric motor. The converter operates to convert an input utility power into a controlled power signal that is supplied to the electric motor. The controller operates to control and regulate the converter so that the converter only supplies the specified controlled power signal to the electric motor.

One particular type of electrical drive system is an induction drive system. The induction drive system utilizes an induction motor and a converter having a rectifier/inverter, often referred to as an inverter, to convert the input utility power into the controlled power signal supplied to the induction motor. The induction motor generally has three stator windings that surround a rotor. The converter switches power between each of the stator windings such that the time delay or sequence of the currents flowing in the stator windings produces a magnetic field pattern of alternating north and south poles that generates a rotational force on the rotor.

The development of advanced power electronic switching devices has enabled high frequency switching, or pulse-width modulation, of the induction motor. Pulse-width modulation increases the efficiency and flexibility of the induction motor. The high frequency switching, or pulses, enables numerous commutations during each frequency period. For example, insulated gate bipolar transistors allow switching frequencies of 2 to 20 kHz and rise times of 0.1 $\mu$s. The fast rise time, or dv/dt, occurs at each switching instance and often causes several problems in conventional induction drive systems.

One such problem with conventional induction drive systems is that the high dv/dt causes differential mode and common mode dv/dt current leakage losses. The higher the dv/dt, the greater the differential and common mode dv/dt current leakage losses. A high common mode current leakage can interfere with ground fault protection system in an industrial facility. In addition, a high dv/dt at the motor terminals causes stress on the motor as well as creating unwanted electromagnetic fields. The high dv/dt at the motor terminals may contribute to winding failures, insulation failures, and early bearing wear due to bearing currents induced in the rotor.

Long leads between the output of the inverter and the induction motor exacerbate the problems with conventional induction drive systems. Long leads are susceptible to a transmission line effect in which the voltages at the motor terminals are much higher than the voltages at the output of the inverter. The increase in the dv/dt at the motor terminals drastically increases the differential and common mode dv/dt leakage currents as well as the adverse effects on the induction motor.

SUMMARY OF THE INVENTION

Accordingly, a need has arisen for a converter output filter for an induction drive system. The present invention provides a converter output filter for an induction drive system that substantially eliminates or reduces problems associated with prior systems and methods.

In accordance with one embodiment of the present invention, a converter output filter comprises an L-R-C network operable to be coupled between a converter at a converter output and a DC-link midpoint node of the converter. The L-R-C network comprises an inductive element, a resistive element, and a capacitive element coupled in series. An electrical device is operable to be coupled to the L-R-C network between the inductive element and the resistive element. In a particular embodiment, the electrical device is an induction motor.

Technical advantages of the present invention include providing a converter output filter that substantially reduces differential and common mode dv/dt even when long leads are used. Reducing the differential mode dv/dt reduces differential mode dv/dt current losses, as well as reducing the stresses on the induction motor that can cause winding failures, insulation failures, and early bearing wear. Accordingly, the induction motor is more efficient and has an extended operational life.

The reduction in common mode dv/dt also reduces common mode dv/dt current losses, as well as reducing induced shaft voltage in the induction motor. Accordingly, the efficiency of the induction drive system is increased.

An additional technical advantage of the present invention is that the converter output filter reduces or eliminates the effects of using long leads. In particular, the voltage amplification between the converter outputs and the electrical device due to a transmission line effect is minimized. Accordingly, the converter can be located at a remote location from the electrical device without adversely affecting the performance of the electrical device.

Yet another technical advantage is that the converter can be quickly and easily retrofitted to include the converter output filter.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
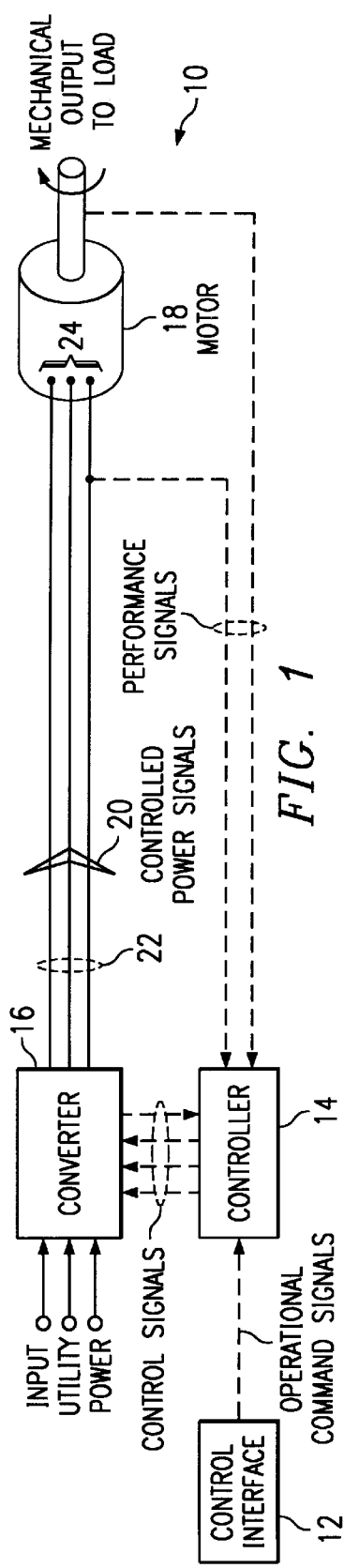
FIG. 1 is a schematic diagram illustrating an induction drive system in accordance with the present invention.
Figure 2:
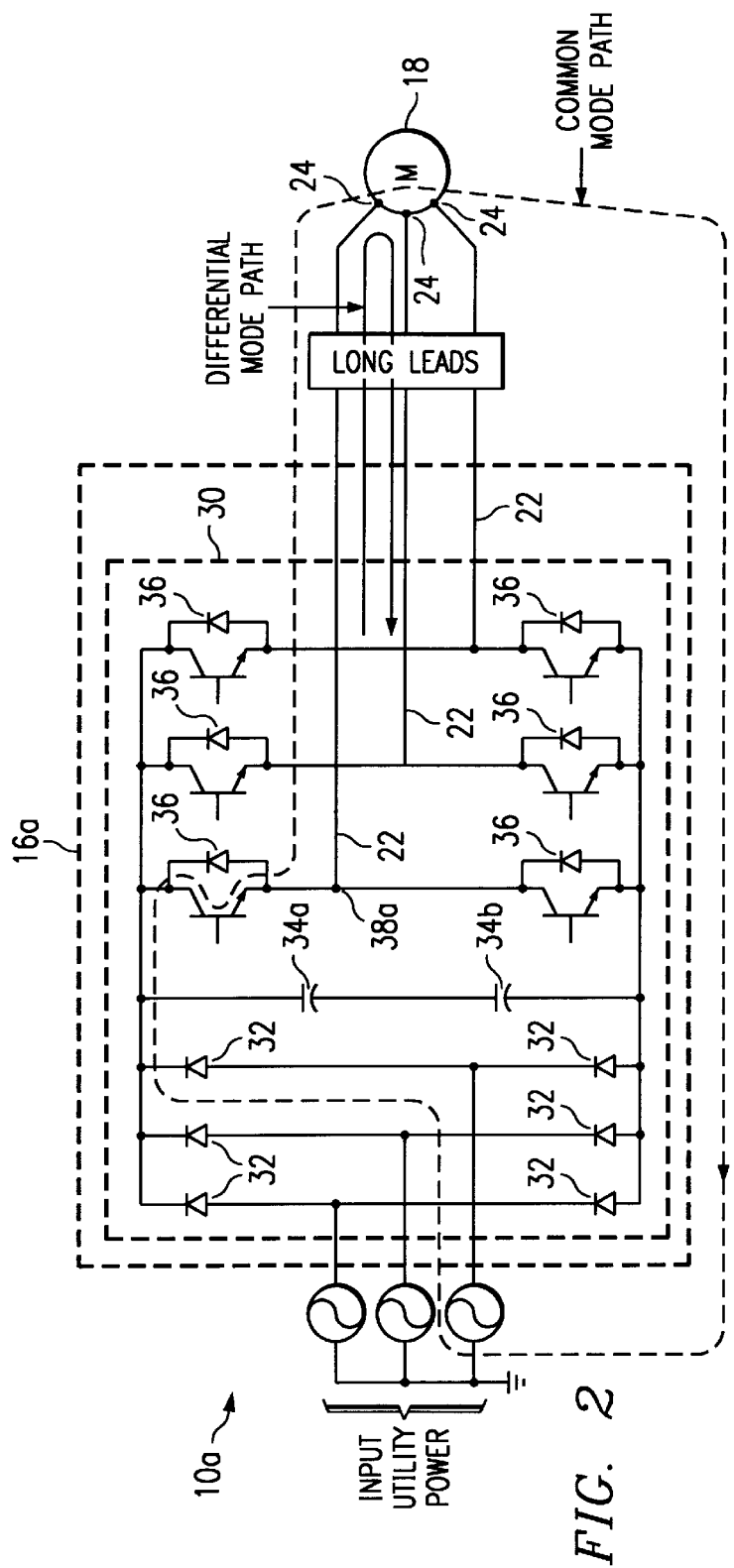
FIG. 2 is a schematic diagram illustrating the differential mode and common mode dv/dt current leakage paths in an induction drive system.
Figure 3:
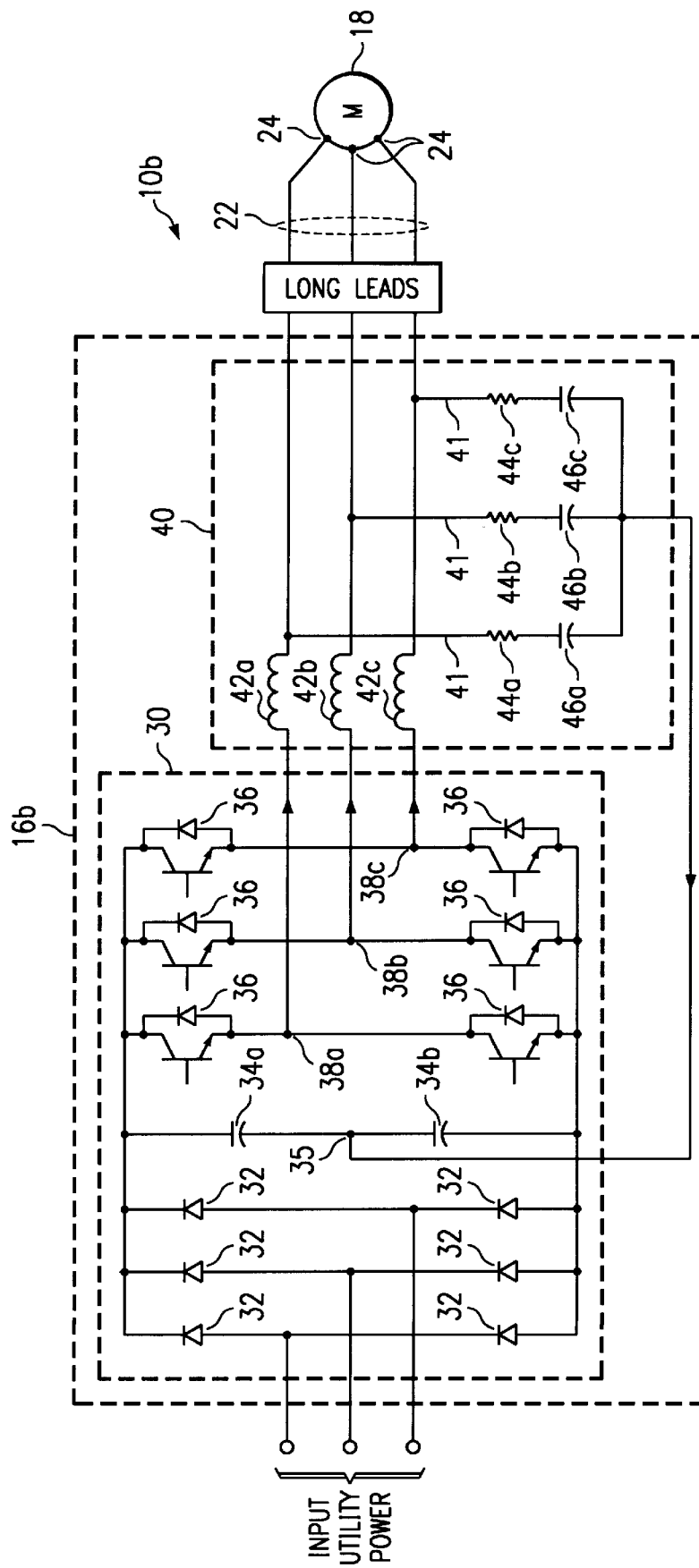
FIG. 3 is a schematic diagram illustrating an induction drive system with a converter output filter in accordance with the present invention.

FIGS. 1 through 3 illustrate various aspects of a converter output filter for an induction drive system. Although the converter output filter is described in terms of an induction drive system that utilizes pulse-width modulation, the converter output filter may be utilized in any suitable induction drive system without departing from the scope of the present invention. For example, the converter output filter may be used in an induction drive system utilizing square-wave voltage signals, current signals, or in induction drive systems utilizing a phase-controlled cycloconverter, or other suitable converter.

As described in greater detail below, the converter output filter comprises an inductive element, a resistive element, and a capacitive element that can be coupled between the output of an inverter and a dc-link midpoint node of the inverter. The induction motor is coupled to the converter output filter between the inductive element and the resistive element. The converter output filter substantially reduces both the differential and common mode dv/dt at the motor terminals. The reduction in differential and common mode dv/dt at the motor terminals reduces the amplified voltages at the motor terminals and reduces the adverse effects on the induction motor. The reduction in differential and common mode dv/dt also reduces the differential and common mode dv/dt leakage currents, thereby making the induction drive system more efficient.

FIG. 1 is a schematic diagram generally illustrating an induction drive system 10. In one embodiment, the induction drive system 10 comprises a control interface 12, a controller 14, a converter 16, and an induction motor 18. The control interface 12 is coupled to the controller 14 and operates to communicate operational command signals to the controller 14. The controller 14 is coupled to the converter 16 and operates to communicate control signals to the converter 16 based on the operational command signals received from the control interface 12. The converter 16 is coupled to the controller 14 and to the induction motor 18. The converter 16 receives an input utility power having a constant voltage and frequency, and converts the input utility power into a controlled power signal 20 that is suitable for the induction motor 18. The form, frequency, and amplitude of the controlled power signal 20 are determined by the control signals received by the converter 16 from the controller 14. The controlled power signal 20 is communicated to the induction motor 18 by leads 22. The leads 22 are coupled to the induction motor 18 at motor terminals 24. The induction motor 18 receives the controlled power signal 20 and converts the controlled power signal 20 into a mechanical output to a load. The induction motor 18 is coupled to the controller 14 and communicates performance signals to the controller 14. The controller 14 varies the control signals in response to the performance signals from the induction motor 18. It will be understood that the drive system 10 may comprise other suitable devices without departing from the scope of the present invention.

FIG. 2 is a schematic diagram illustrating the differential mode and common mode dv/dt current leakage paths in an induction drive system 10a. As illustrated, the induction drive system 10a comprises a conventional converter 16a that is comprised of a conventional pulse-width modulated inverter 30. The inverter 30, in accordance with the embodiment illustrated, comprises a number of diodes 32, capacitive elements 34a and 34b, and electronic switching devices 36 coupled in parallel. The input utility power is coupled to the diodes 32. The diodes 32 in combination with the capacitive elements 34a and 34b form a rectifier that operates to produce DC power. Disposed between the capacitive elements 34a and 34b is a DC-link midpoint node 35. It will be understood that the converter 16a may comprise other suitable systems and devices without departing from the scope of the present invention.

The electronic switching devices 36 are controlled by the controller 14, as shown in FIG. 1. The electronic switching devices 36 are generally semiconductor power switches, such as insulated gate bipolar transistors or the like. The leads 22 are coupled to the inverter 30 between the electronic switching devices 36 at converter outputs 38a, 38b, and 38c, respectively. The electronic switching devices 36 form an inverter that switches the DC power "on" and "off" to produce the controlled power signals 20 that are communicated to the induction motor 18 by leads 22.

Pulse width modulation is accomplished by switching the DC power "on" and "off" multiple times during each power cycle. In other words, when a positive voltage signal, as part of the controlled power signals 20, is applied to a winding of the induction motor 18, the positive voltage signal is in the form of numerous small positive voltage pulses. The number and size of each positive voltage pulse produced by the electronic switching devices 36 is controlled by the controller 14. The ability to vary the number and size of the positive voltage pulses increases the efficiency and flexibility of the induction drive system 10.

The faster the switching speed of the electronic switching devices 36, the faster the DC voltage can be switched "on" and "off" to the converter outputs 38a, 38b, and 38c, to produce the controlled power signals 20. The faster the switching speed of the electronic switching devices 36, the greater the dv/dt in the controlled power signals 20. As discussed previously, the greater the dv/dt in the controlled power signals 20, the greater the dv/dt current leakage in the induction drive system 10a. In addition, the longer the leads 22, the greater the dv/dt at the motor terminals 24 due to the transmission line effect. For example, in one 480V application using a 480 V induction motor 18 and 100 foot leads 22, the dv/dt is approximately 7,000 V/$\mu$s at the converter outputs 38a, 38b, and 38c, and 11,000 V/$\mu$s at the motor terminals 24.

The common mode dv/dt current leakage results from the rapid voltage changes between the conducting portions of the induction drive system 10a and ground. The rapid voltage changes induce a current in conductive materials that are exposed to the magnetic field produced by the rapidly changing voltages. For example, the rapid voltage changes induce a current in the metallic housing (not expressly shown) that generally encases the induction motor 18.

The differential mode dv/dt current leakage results from the rapid voltage changes between the individual leads 22. The differential mode dv/dt current leakage path is illustrated as a line-to-line leakage path between the leads 22. The rapid voltage change in one lead 22 induces a current in the other leads 22. Conventional output filters (not expressly shown) can reduce the differential mode dv/dt current leakage, but do not reduce the common mode dv/dt current leakage.

FIG. 3 illustrates a portion of an induction drive system 10b in accordance with the present invention. In one embodiment, the induction drive system 10b comprises a converter 16b comprising a converter output filter 40 coupled to the inverter 30 discussed in FIG. 2. It will be understood that the converter 16b may comprise other suitable inverters 30 without departing from the scope of the present invention. For example, the inverter 30 may be a square-wave voltage source inverter, a current source inverter, a phase-controlled cycloconverter, or other suitable converter.

The converter output filter 40 comprises an L-R-C network 41 disposed between each converter output 38a, 38b, and 38c and the DC-link midpoint node 35. The leads 22 connecting the induction motor 18 to the converter output filter 40 are coupled to the individual L-R-C networks 41. In the embodiment illustrated, one L-R-C network 41 comprises an inductive element 42a, a resistive element 44a, and a capacitive element 46a coupled in series between the converter output 38a and the DC-link midpoint node 35. Similarly, the other L-R-C networks 41 comprise inductive elements 42b and 42c, resistive elements 44b and 44c, and capacitive elements 46b and 46c, coupled in series between the converter outputs 38b and 38c and the DC-link midpoint node 35, respectively. In this embodiment, the respective leads 22 are coupled to each respective L-R-C network 41 between the respective inductive elements 42a, 42b, and 42c, and the respective resistive elements 44a, 44b, and 44c. It will be understood that the converter output filter 40 may comprise other suitable devices without departing from the scope of the present invention. For example, the output filter 40 may include additional resistive elements, capacitive elements, and inductive elements as required for a particular application, as well as diodes, electronic switches, and other suitable electronic devices.

The inductance of the individual inductive elements 42a, 42b, and 42c, the resistance of the individual resistive elements 44a, 44b, and 44c, and the capacitance of the individual capacitive elements 46a, 46b, and 46c, are varied to optimize the induction drive system 10b by reducing the common mode dv/dt and the differential mode dv/dt while simultaneously minimizing losses from the converter output filter 40. For example, sample inductances, resistances, and capacitances for inductive elements 42a, 42b, and 42c, resistive elements 44a, 44b, and 44c, and capacitive elements 46a, 46b, and 46c, respectively, are shown as a factor of the length of leads 22, for various sample voltages in Table 1 below.

TABLE 1

SAMPLE INDUCTOR, RESISTOR, AND CAPACITOR VALUES
FOR 480 V, 575 V, 690 V ADJUSTABLE SPEED DRIVE SYSTEM

|  | Lead Length | | |
|---|---|---|---|
|  | 100 ft. | 200 ft. | 500 ft. |
| Inductance (Henrys) | $160–350 \times 10^{-6}$ | $330–400 \times 10^{-6}$ | $800–1,000 \times 10^{-6}$ |
| Resistance (Ohms) | 100—300 | 100–300 | 100–300 |
| Capacitance (Farads) | $20–130 \times 10^{-9}$ | $40–140 \times 10^{-9}$ | $100–650 \times 10^{-9}$ |

The sample inductances, resistances, and capacitances provided in Table 1 are examples only and are not intended to limit the present invention to the values specified.

Table 2 below illustrates a comparison of experimental results from an induction drive system utilizing a 480V, 20 HP high-efficiency induction motor, a pulse-width modulated inverter set at 3 kHz carrier, and with 100 foot leads between the inverter and the induction motor. In the embodiment of the converter output filter 40 used for this experiment, the inductance of each inductive element 42a, 42b, and 42c is 200 μH; the resistance of each resistive element 44a, 44b, and 44c is 190 ohms; and the capacitance of each capacitive element 46a, 46b, and 46c is 75 nF.

TABLE 2

COMPARISON OF EXPERIMENTAL RESULTS

|  | Without Filter | Conventional Filter | Converter Output Filter 40 |
|---|---|---|---|
| Peak voltage at motor terminals | 1,260 (V) | 750 (V) | 730 (V) |
| Differential mode dv/dt at motor terminals | 3,000 (V/μs) | 120 (V/μs) | 120 (V/μs) |
| Common mode dv/dt Current Leakage to Ground | 430 mA (RMS) | 252 mA (RMS) | 132 mA (RMS) |
| Induced shaft voltage to ground | 864 mV (RMS) | 442 mV (RMS) | 234 mV (RMS) |
| Total power loss due to filter | 0 (Watts) | 55 (Watts) | 125 (Watts) |

As illustrated in Table 2, the converter output filter 40 and the conventional filter similarly reduce the peak voltage at the motor terminals. Likewise, the converter output filter 40 produces the same reduction in the differential mode dv/dt as the conventional filter. The converter output filter 40, however, reduces the common mode dv/dt current leakage by nearly one-half of the common mode dv/dt current leakage of the conventional filter. In addition, the converter output filter 40 reduces the induced shaft voltage to ground by nearly one-half of the induced shaft voltage of the conventional filter. One adverse effect of the converter output filter 40 is that the power loss is greater than that of the conventional filter; however, the power loss is within reasonable limits.

In short, the converter output filter comprises an L-R-C network that can be coupled between a converter at a converter output and a DC-link midpoint node of the converter. The L-R-C network comprises an inductive element, a resistive element, and a capacitive element coupled in series. An electrical device, such as an induction motor, can be coupled to the L-R-C network between the inductive element and the resistive element.

The converter output filter reduces the differential and common mode dv/dt at the motor terminals even if long leads are used. Reducing the differential and common mode dv/dt reduces the stresses on the electrical device. For example, in the case of an induction motor, the reduction in differential mode dv/dt reduces operational stresses that can cause winding failures, insulation failures, and early bearing wear. Accordingly, the electrical device is more efficient and has an extended operational life.

The converter output filter also significantly reduces the common mode dv/dt current losses. In the case of an induction motor, reducing common mode dv/dt reduces induced shaft voltage in the induction motor. Accordingly, the efficiency of the induction drive system is increased. In addition, the converter output filter reduces or eliminates the effects of using long leads between the converter and the electrical device. In particular, the voltage amplification between the voltage at the converter outputs and the motor terminals due to the transmission line effect is minimized.

Furthermore, the converter output filter can be quickly and easily installed in the enclosure that houses the converter.

Although the present invention has been described in several embodiments, various changes and modifications may be suggested to one skilled in the art. It is intended that the present invention encompass such changes and modifications that fall within the scope of the appended claims.

What is claimed is:

1. A converter output filter comprising:

an L-R-C network coupled between each converter output of a converter and a DC-link midpoint node of the converter;

wherein the L-R-C network comprises an inductive element, a resistive element, and a capacitive element coupled in series; and an electrical device is operable to be coupled to the L-R-C network between the inductive element and the resistive element.

2. The converter output filter of claim 1, wherein the electrical device is an induction motor.

3. The converter output filter of claim 1, wherein the inductive element has an inductance in the range of 160 μH to 350 μH, the capacitive element has a capacitance in the range of 20 nF to 130 nF, and the resistive element has a resistance in the range of 100 Ω to 300 Ω.

4. The converter output filter of claim 1, wherein the inductive element has an inductance in the range of 330 μH to 400 μH, the capacitive element has a capacitance in the range of 40 nF to 140 nF, and the resistive element has a resistance in the range of 100 Ω to 300 Ω.

5. The converter output filter of claim 1, wherein the inductive element has an inductance in the range of 800 μH to 1,000 μH, the capacitive element has a capacitance in the range of 100 nF to 650 nF, and the resistive element has a resistance in the range of 100 Ω to 300 Ω.

6. The converter output filter of claim 1, wherein the converter is a pulse-width modulated inverter.

7. An induction drive system comprising:

a converter comprising a DC-link midpoint node and a converter output;

a converter output filter comprising an inductive element, a capacitive element, and a resistive element coupled in series, the converter output filter coupled between the converter output and the dc-link midpoint node; and an electrical device coupled to the converter output filter.

8. The induction drive system of claim 7, wherein the electrical device is an induction motor.

9. The induction drive system of claim 7, wherein the inductive element has an inductance in the range of 160 μH to 350 μH, the capacitive element has a capacitance in the range of 20 nF to 130 nF, and the resistive element has a resistance in the range of 100 Ω to 300 Ω.

10. The induction drive system of claim 7, wherein the inductive element has an inductance in the range of 330 μH to 400 μH, the capacitive element has a capacitance in the range of 40 nF to 140 nF, and the resistive element has a resistance in the range of 100 Ω to 300 Ω.

11. The induction drive system of claim 7, wherein the inductive element has an inductance in the range of 800 μH to 1,000 μH, the capacitive element has a capacitance in the range of 100 nF to 650 nF, and the resistive element has a resistance in the range of 100 Ω to 300 Ω.

12. The induction drive system of claim 7, wherein the converter is a pulse-width modulated inverter.

13. A method of reducing differential and common mode dv/dt in an induction drive system, the method comprising:

providing a converter comprising a DC-link midpoint node and at least one converter output;

coupling a converter output filter between the converter output and the DC-link midpoint node, the converter output filter having an associated inductance, resistance, and capacitance, the associated inductance, resistance, and capacitance selected to reduce the differential and common mode dv/dt in the induction drive system; and coupling an electrical device to the converter output filter.

14. The method of claim 13, wherein the converter output filter comprises an inductive element, a capacitive element, and a resistive element coupled in series.

15. The method of claim 13, wherein the electrical device is an induction motor.

16. The method of claim 13, wherein the inductance is in the range of 160 μH to 350 μH, the capacitance is in the range of 20 nF to 130 nF, and the resistance is in the range of 100 Ω to 300 Ω.

17. The method of claim 13, wherein the inductance is in the range of 330 μH to 400 μH, the capacitance is in the range of 40 nF to 140 nF, and the resistance is in the range of 100 Ω to 300 Ω.

18. The method of claim 13, wherein the inductance is in the range of 800 μH to 1,000 μH, the capacitance is in the range of 100 nF to 650 nF, and the resistance is in the range of 100 Ω to 300 Ω.

* * * * *